United States Patent [19]
Davies et al.

[11] 3,734,660
[45] May 22, 1973

[54] APPARATUS FOR FABRICATING A BEARING DEVICE

[75] Inventors: Gilbert E. Davies; Robert J. Loubier; John M. Weston; Robert A. Muhn, all of Fort Wayne, Ind.

[73] Assignee: Tuthill Pump Company, Chicago, Ill.

[22] Filed: June 17, 1971

[21] Appl. No.: 153,988

Related U.S. Application Data

[62] Division of Ser. No. 1,733, Jan. 9, 1970, Pat. No. 3,629,921.

[52] U.S. Cl. .................................. 425/123, 425/129
[51] Int. Cl. .................................................. B29f 1/10
[58] Field of Search ..................... 425/110, 116, 117, 425/123, 128, 129; 308/72; 29/441, 149.5 B, 149.5 R

[56] References Cited

UNITED STATES PATENTS

| | | | |
|---|---|---|---|
| 3,287,071 | 11/1966 | Tucker | 308/72 |
| 2,703,435 | 3/1955 | Watson | 425/129 X |
| 2,932,081 | 4/1960 | Witte | 29/441 X |
| 3,303,557 | 2/1967 | Litsky | 29/441 X |
| 3,369,285 | 2/1968 | Heim | 29/441 X |
| 3,593,399 | 7/1971 | Bannister | 29/441 X |

*Primary Examiner*—J. Spencer Overholser
*Assistant Examiner*—Michael O. Sutton
*Attorney*—Hood, Gust, Irish, Lundy & Coffey

[57] ABSTRACT

An apparatus for fabricating a bearing device comprising a housing having an opening therethrough, a ball-shaped swivel member positioned within the opening and spaced from the surface of the housing which defines the opening, and a raceway of solidified bearing material in the space between the swivel member and housing, the raceway having a swiveling clearance with and retaining said swivel member in the housing, the inner surface of the raceway being shaped to correspond to a part of an elongated sphere. In the fabrication of this bearing device, the swivel member is reciprocated relative to the housing during the hardening of liquefied bearing material injected into the space between the swivel member and housing. The apparatus which accomplishes this method includes relatively movable members which engage, respectively, the housing and the swivel member, these mold members providing the relative reciprocatory movement.

9 Claims, 9 Drawing Figures

PATENTED MAY 22 1973

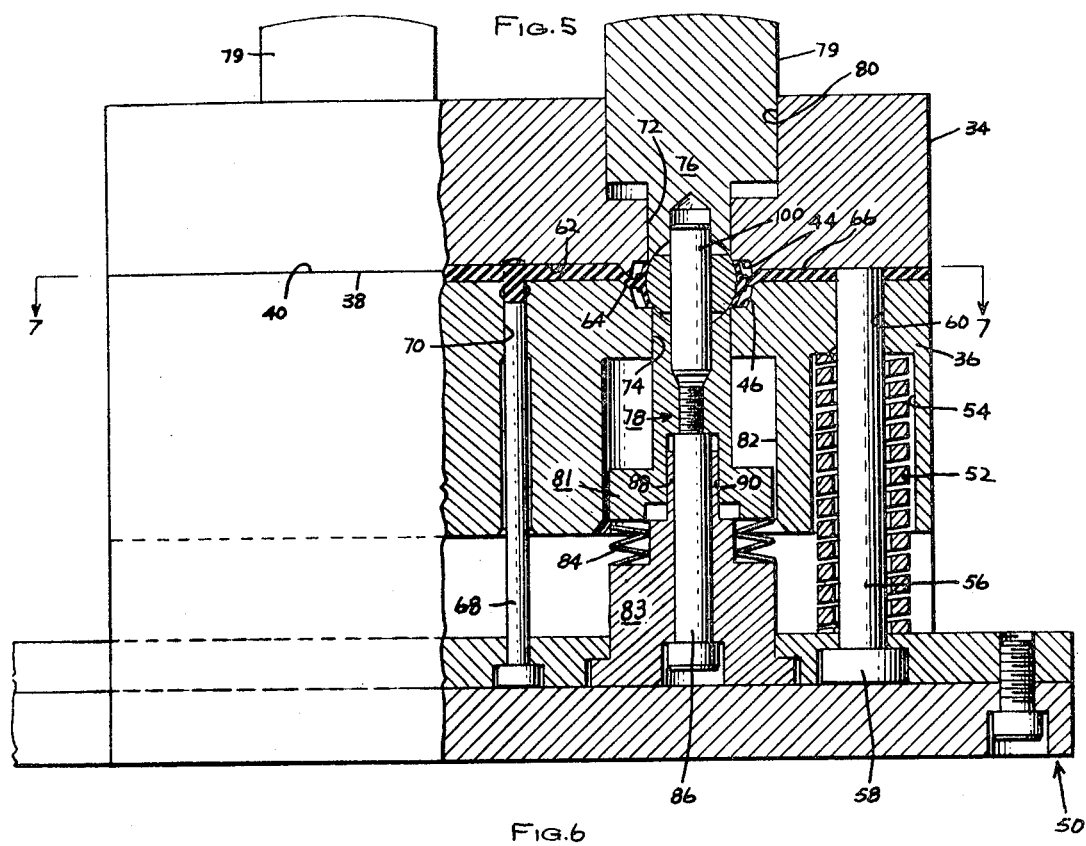
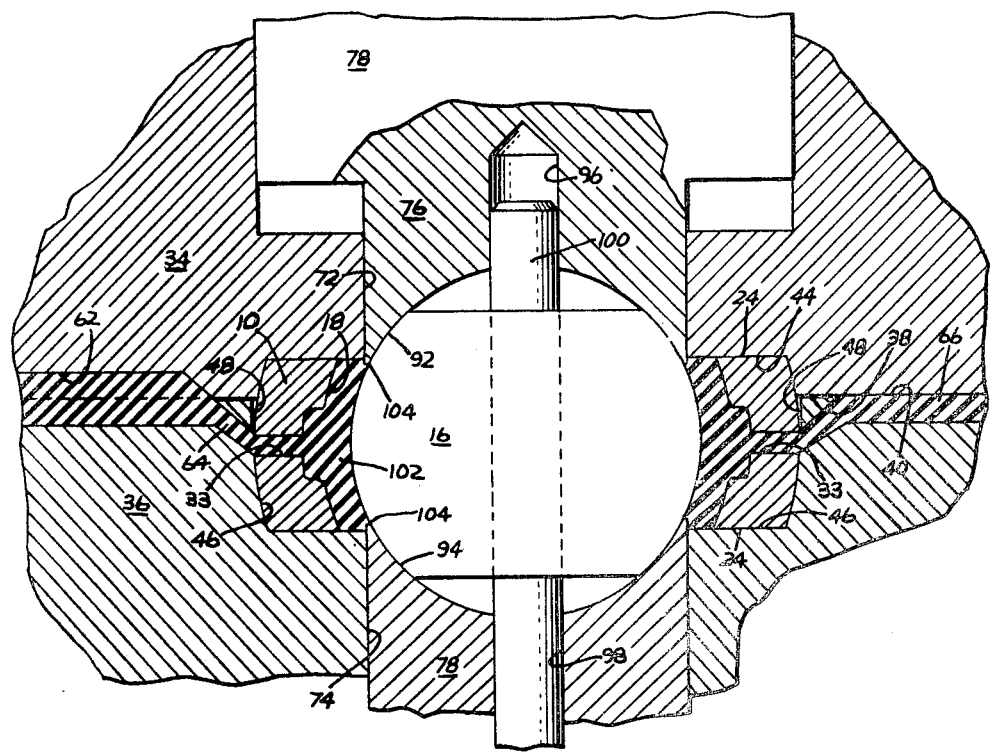

APPARATUS FOR FABRICATING A BEARING DEVICE

This is a Divisional Application of Application Ser. No. 1,733 filed Jan. 9, 1970, now U.S. Pat. No. 3,629,921.

BACKGROUND OF THE INVENTION

1. Field of the Invention

This invention relates generally to a bearing assembly which includes a ball-shaped swivel member retained for swiveling movement in a housing by means of a raceway of bearing material, and more particularly, to such a bearing assembly in which the raceway in its fabricated form has a positive swiveling clearance with the swivel member, to a method in which the housing and swivel member are reciprocable relative to each other in order to produce the positive clearance between the swivel member and the raceway, and to an apparatus used in molding of the raceway whereby the swivel member and housing are moved relative to each other during hardening of liquefied bearing material injected into the space provided for the raceway.

2. Description of the Prior Art

In the manufacture of such a bearing assembly, it is necessary that the swivel member be freely swivelable universally within the housing with a minimum degree of looseness. It is also desirable that the raceway of bearing material separating the swivel member from the housing be secured to the latter against movement.

In the past, certain plastic bearing materials such as polyamides and polycarbonates have been used in the formation of the raceway, but the finished bearing assembly has not been altogether satisfactory because of excessive tightness of the swivel member in the raceway and looseness of the raceway in the housing. One method employed for molding the raceway has been to use a thermoplastic or thermosetting plastic material injected into intimate engagement with the swivel member and hardened in this intimately engaged condition through the use of strictly controlled, relatively low pressures which tend to preclude shrinkage of the plastic onto the swivel member which otherwise would lock the swivel member against movement. This technique has not been satisfactory as it imposes stringent process controls which result in higher costs because of the inability of the process to produce close piece-to-piece uniformity.

SUMMARY OF THE INVENTION

In accordance with the broader aspects of this invention, there is provided a method of fabricating a bearing assembly comprising a housing and a ball-shaped swivel member, in which the swivel member is positioned within an opening in the housing so as to provide a space surrounding the swivel member. The liquefied hardenable bearing material is then injected into the space and becomes engaged with both the housing and the swivel member. The swivel member and housing are continuously moved relative to each other in a direction that alters the shape of the space until the liquefied bearing material hardens. The characteristic of this continuous relative movement is such that it results in free omnidirectional movement of the swivel member without excessive play.

More specifically, the swivel member is reciprocated relative to the housing in a direction parallel to the axis of the opening whereby the raceway will have the diameter of the swivel member taken in a plane normal to the axis but as to its dimension at right angles thereto, it will be slightly longer than the swivel member thereby providing for proper swiveling clearance.

The apparatus includes a first mold means at least partially closing the opposite ends of the annular space between the swivel member and the housing, second means for holding the swivel member in position in said housing and for completing the closure of these opposite ends, the first and second means being relatively movable whereby said swivel member may be reciprocated relative to the housing, and means for filling the space with liquefied hardenable bearing material which hardens during the relative continuous movement between the swivel member and the housing.

It is an object of this invention to provide an apparatus for molding a raceway of bearing material in such a bearing assembly in a manner that provides an operating clearance for the swivel member without additional operations being required after molding.

A further object of this invention is to provide an apparatus for molding a raceway into such a bearing assembly wherein the housing and the swivel member are continuously moved relative to each other during the injection phase of the molding cycle.

The above-mentioned and other features and objects of this invention and the manner of attaining them will become more apparent and the invention itself will be best understood by reference to the following description of an embodiment of the invention taken in conjunction with the accompanying drawings, wherein:

IN THE DRAWINGS

FIG. 5 is a side view, partially sectioned along the section line 5—5 of FIG. 7, of an apparatus used in fabricating the bearing assembly of this invention;

FIG. 6 is an enlargement in cross-section of a part of the arrangement of FIG. 5;

DESCRIPTION OF EMBODIMENTS

Figure 3:
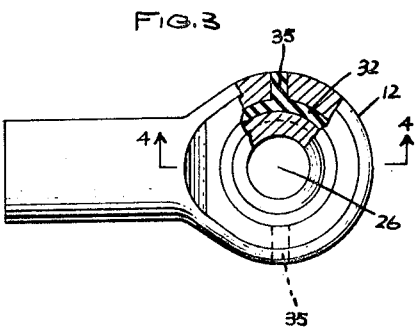
FIG. 3 is a side view of the completed assembly partially sectioned for clarity of illustration.
Figure 2:
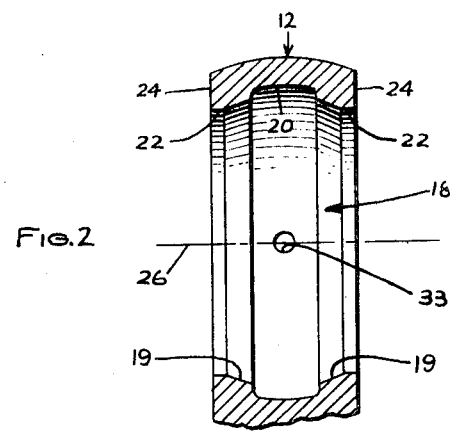
FIG. 2 is a fragmentary axial section thereof.
Figure 4:
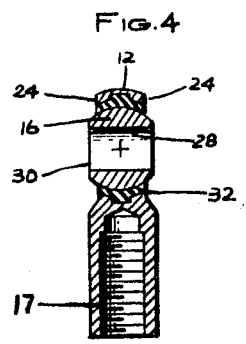
FIG. 4 is an axial sectional view of the embodiment of FIG. 3.

Referring to the drawings and more particularly to FIGS. 1 through 4, an embodiment of this invention is in the form of a rod end in which a support member or housing generally indicated by the numeral 10 has an enlarged, annular flat head 12 and a laterally extending shank 14 provided in the usual instance with a threaded bore 17 (FIG. 4). A swivel member, and in this instance a ball-shaped bearing member or ball 16, is positioned within an opening 18 in the head 12. As shown more clearly in FIG. 2, the opening 18 may be part spherical as indicated by the numeral 19 generally conforming to the curvature of the ball 16 and is provided midway between the surfaces 24 with an annular coaxial recess 20. The end portions of the opening 18 at 22 which extends from the part spherical curvatures 19 outwardly to the surfaces 24 are cylindrically shaped and of equal diameter. The two surfaces 24 are flat and parallel, lying in planes normal to the axis 26 of the opening 18. The parts 19, 20 and 22 of the opening 18 are coaxial about the axis 26.

The ball 16 in this rod end is of conventional design having a coaxial bore 28 adapted to receive a mounting stud or the like (not shown) and furthermore has flat parallel surfaces defining opposite sides 30 which, when the ball 16 is centered in the head 12 as shown in FIG. 4, lie in parallel planes positioned outwardly from and parallel to the head surfaces 24 as shown.

The ball 16 in the design shown conforms generally to the curvature 19 of the opening 18 (FIG. 2) but is of smaller diameter so as to provide a ring-like clearance or space therebetween defined at the outer periphery by the parts 19, 20 and 22. This space is occupied by a raceway 32 (FIGS. 3-4) of bearing material secured in the head 12 by means of the annular groove 20 and two trunnion-like appendages 35 which fill diametrically opposite openings 33 in the head 12 as shown in FIG. 3. With the raceway 32 properly formed, the ball 16 will swivel freely and be securely mounted in the housing 10.

Figure 1:
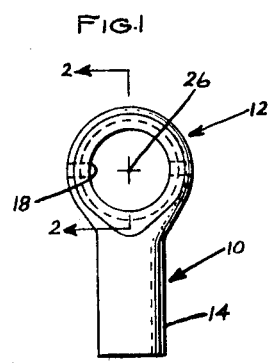
FIG. 1 is a side elevation of the housing part of one embodiment of this invention.

Referring more particularly to FIGS. 5 through 9, the apparatus utilized in making the bearing assembly of FIGS. 3 and 4 will be described. In general, the apparatus performs the operation of molding the raceway 32 in such a manner that proper operating clearance for free swiveling movement of ball 16 is provided without any additional operations being required after molding. The molding apparatus generally comprises two mold sections, an upper section 34 and a lower section 36. The lower section 36 may be considered as stationary and the upper section 34 as movable vertically for opening and closing the mold. Specifically, the upper mold section 34 is adapted to be mounted in a conventional injection molding machine by being attached to the movable platen of the machine whereby it can be raised and lowered relative to the stationary mold section 36, which is attached to the stationary platen. These mold sections 34 and 36 having parting surfaces 38 and 40, respectively, and when closed, define a cavity 42 corresponding to the shape of the housing 10 as shown in FIG. 1, a part of the cavity indicated by the numeral 44 (see FIGS. 5 and 6) being formed in the upper section 34 and an opposite part 46 being provided in the lower section 36. In the enlargement of FIG. 6, it will be apparent that cavity portion 46 is larger than portion 44. While the cavity portion 46 conforms to the external contour of the housing 10, short cylindrical wall sections 48 are formed with some clearance with respect to the housing 10 so as to permit the latter being inserted into and removed from the cavity portion 46.

Figure 7:
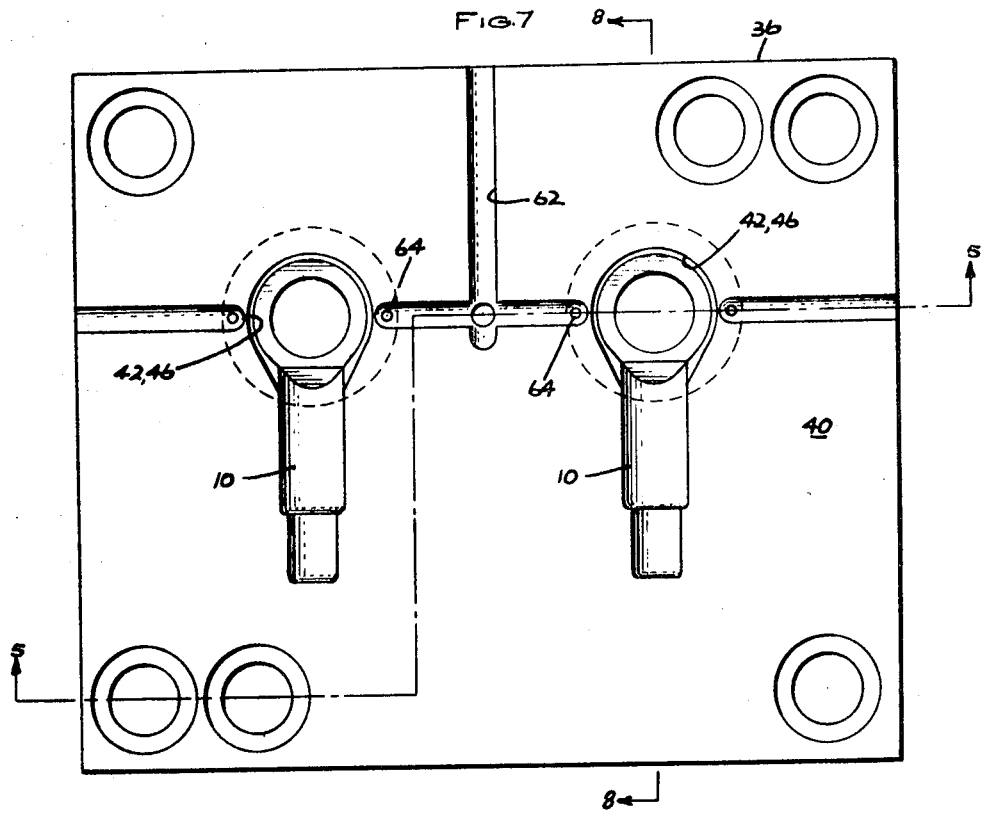
FIG. 7 is a top plan view of the lower mold section of the apparatus of FIG. 5 with two bearing housings positioned therein.
Figure 8:
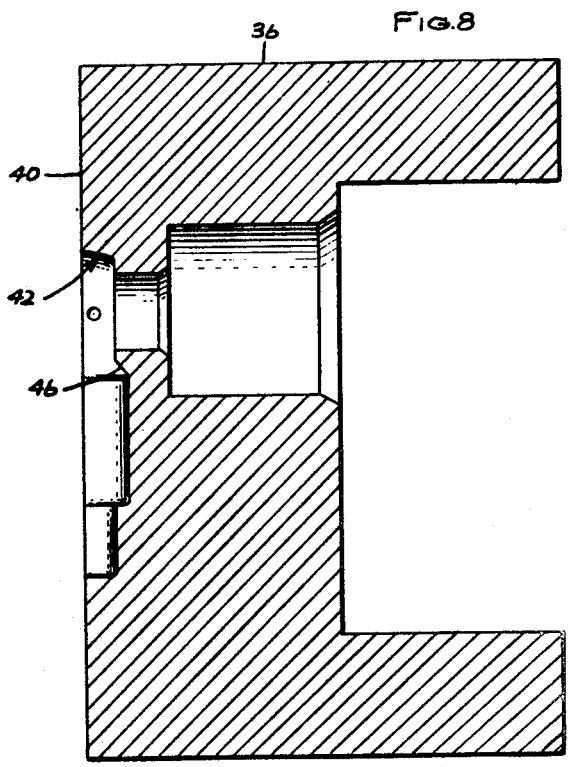
FIG. 8 is a cross-section of lower mold plate of FIG. 7 taken substantially along section line 8—8 thereof.

The lower mold section 36 is rigidly mounted on the stationary lower platen of the machine. An ejector plate assembly 50 is vertically movable relative to mold section 36, being guided with respect thereto by return springs 52 and pins 56, there being four such pins and spring assemblies located near the corners of the assembly which is substantially rectangular as shown in FIG. 7. The spring 52 is compressed between the upper surface of the plate 50 and the base of a socket 54 in the mold section 36 whereby the latter is yieldably urged upwardly relative to the plate 50. To serve as a guide, the pin 56 having a head 58 locked into the plate assembly 50 extends upwardly through the spring 52 and is slidably received in a bore 60, as shown.

There are two mold cavities provided in the apparatus, these being indicated by the numeral 42 in FIG. 7. A sprue passage 62 of T-shape is formed into the two parting surfaces 38 and 40 and is provided with tunnel gates 64 which connect with cavity portion 46 as shown more clearly in FIG. 6. Exhaust runners 66 are also provided in the parting surfaces 38 and 40 and extend from the side of said cavity portion 46 diametrically opposite from the gate 64 and opens to atmosphere.

Mounted on the ejector plate assembly 50 and extending upwardly therefrom is a runner ejector pin 68 slidably received by a passage 70 in the mold section 36.

Both of the mold sections 34 and 36 are provided with vertically aligned cylindrical bores 72 and 74, respectively, which are of equal diameter. Two cylindrical mold inserts 76 and 78 are received, respectively, by the bores 72 and 74 for reciprocation therein. The insert 76 has a head 79 of enlarged diameter, this head being reciprocably received by a socket 80 of complementary shape in the mold section 34. Similarly, the insert 78 has an enlarged diameter head 81 which is reciprocably received by a cylindrical socket 82 for vertical guiding movement in the lower mold section 36. This enlarged head 81 is spaced above a cylindrical supporting pedestal 83 on plate assembly 50 by means of a compression spring 84. The pedestal 83 coaxially receives for reciprocal sliding movement a headed pin 86, as shown, which is threaded coaxially to the insert 78, as shown. The upper end of the pedestal 83 is provided with an upstanding tubular portion 88 received in a companion socket 90 in the enlarged head 81 to guide the latter and the insert 78 for truly vertical movement relative to both the pedestal and the lower mold section 36. The guide pin 86 obviously moves with the insert 78.

The facing surfaces of the two inserts 76 and 78, as best shown in FIG. 6, are spherically concave at 92 and 94, respectively, to conform precisely to the curved exterior of the ball 16, as shown. Both inserts 76 and 78 are also provided with vertically aligned coaxial bores 96 and 98 of substantially equal diameter which receive therein when closed the opposite ends, respectively, of a guide pin 100. This guide pin 100 is press-fitted and thereby secured to the insert 78 and is slidably fitted to the insert 76 by reason of a slight clearance with the bore 96.

As is shown more clearly in FIG. 5, the heads 79 of the two inserts 76 protrude above the mold section 34. It should also be noted that there is a clearance between each head 79 and the bottom of its socket 80.

Loading of the apparatus preparatory to a molding operation will now be explained. First, the injection molding machine in which the apparatus is mounted is operated to lift the upper mold section 34 several inches above the upper surface 40 of the lower section 36, the inserts 76 being carried upwardly therewith leaving exposed the upstanding guide pin 100 centered in the lower cavity portion 46 (see FIG. 6).

Two housings 10 are placed in the cavity portions 46 as shown more clearly in FIGS. 6 and 7. Two gate passages 33 on opposite sides of the head 12 are positioned to communicate with the gate 64 and the exhaust runners 66. A ball 16 is fitted over the guide pin 100 to nest in the socket 94 which fits precisely the curved contour of the ball 16 as shown.

The upper mold section 34 is lowered into operative engagement with the lower section 36 whereby the concave surface 92 of the insert 76 will precisely sealingly engage the ball 16 exterior and the upper end of the pin 100 will enter the guide bore 96. Considering FIGS. 5 and 6, application of downward force to the head 79 will result in application of this same force to the ball 16 and the insert 78. By using an adequate force, the insert 76, ball 16 and insert 78 may be moved downwardly in unison against the upward force of the spring 84. By relaxing this downward force, the spring 84 will move the insert with the ball 16 clamped therebetween upwardly. By controlling the downward force applied to the insert 76 and selecting a proper spring 84, the two inserts 76 and 78 with the ball 16 clamped therebetween can be made to reciprocate vertically uniformly over a predetermined distance.

Plastic bearing material injected into the sprue 62, under normal high injection pressures, typically from 10,000 to 25,000 pounds per square inch, flows through the gate 64, the respective passage 33 and into the annular space between the ball 16 and the inner surface of the opening 18. Once the annular space, denoted by the numeral 102, is completely filled with plastic, the excess will flow out of the opposite passage 33 and the exhaust runners 66. After the bearing material hardens, the upper mold section 34 is lifted from the lower section 36 and the bearing assembly of the ball 16 and the housing 10 is removed from the apparatus. The ball 16 is retained in the housing 10 by means of the plastic liner or raceway 32 that fills the space 102.

As viewed in FIGS. 5 and 6, the cavity portions 44 and 46 have opposed surfaces which conform to and sealingly engage the opposite surfaces 24, respectively, of the housing 10, as shown. Each of these cavity portions 44 and 46 have internal diameters defined by the bores 72 and 74, respectively, which are substantially smaller than the maximum diameter of the opening 18 and slightly smaller than the diameter of the ball 16. Ideally, the perimeters of the sealingly engaged surfaces 92 and 94, respectively, should be in the form of a knife-edge; however, in order to maximize wearlife of the apparatus, a small flat annular surface or edge 104 joins the periphery of the surfaces 92 and 94 with the periphery of the inserts 76 and 78. The radial flat of this small edge 104 needs to be no more than 0.005 of an inch. As shown in FIG. 6, each edge 104 lies in a flat plane coestensive with the plane of the respective surface 24, when the apparatus is closed.

With the mold apparatus closed, as shown in FIGS. 5 and 6, and the housing 10 and ball 16 in place, the cavity 102 will be bounded on one side by the surface of the ball 16 and on the outside by the inner housing surface 18. The opposite ends of the cavity 102 will be defined by the respective flat surfaces of the cavity portions 44 and 46 as well as the edges 104 of the two inserts 76 and 78. These inserts sealingly engage at the surfaces 92 and 94 the ball 16 so as to prevent leakage of liquefied bearing material injected into the cavity 102. The cavity 102 is thereby defined as being annular and having opposite ends closed by the opposed walls of the cavity portions 44, 46, respectively.

The size relationship between the diameters of the bores 72, 74, the ball 16 and the opening 18 are so related that the ends of the annular space 102 are closed more by the cavity portions 44 and 46 than by the inserts 76 and 78. This is an important feature in obtaining the beneficial results of this invention as explained later.

In theory, considering for the moment that the cavity 102 (FIG. 6) is filled with liquid plastic such as polyamide, polycarbonate, urethane, polyethylene, or a suitable liquefiable metallic bearing material, vertical reciprocation of the ball 16 in the embrace of the two mold inserts 76 and 78 is not attended with similar movement of the liquefied bearing material. One of the objectives of the diametral relationship of the various parts, as explained, is to confine the liquefied bearing material in position in the cavity 102 thereby to permit movement of the ball 16 relative thereto. This results in the ball 16 enlarging the bearing cavity contiguous with the ball surface as the liquefied bearing material then hardens. The result is that the hardened bearing material intimately engages and is thereby secured to the surface of the opening 18 and an inner bearing surface of the raceway is formed which conforms substantially to the shape of the ball 16 surface with the exception that the midportion thereof tends to be of cylindrical shape thereby resulting in the inner surface resembling a sphere that has been microscopically elongated, thereby providing a desired clearance with the ball. This may be explained further by considering the ball 16 in FIG. 6 to be reciprocated over an excursion of about 0.030 inches during the period required for the bearing material to harden. Once the bearing material has hardened and the reciprocation terminated, the ball-engaging surface of the bearing material will be slightly elongated but will have an inner diameter in a plane midway between the two surfaces 24 normal to the axis of the opening 18 substantially coextensive with the outer diameter of the ball 16.

It is important that the cavity 102 which forms the raceway 32 be of sufficient volume and radial depth. If the volume and depth are too small, the raceway 32 in the finished product tends to be too tight on the ball 16. By making it adequately large, in accordance with the specific example given hereinafter, the ball 16 can be reciprocated relative to the mass of plastic in order to achieve the swiveling clearance desired. Thus, the presence, the size and the shape of the groove or recess 20 are important design aspects of this invention.

In the finished rod end, the raceway 32 is prevented from being rotated or otherwise accidentally removed from the housing 10 by virtue of the annular rib formed by the groove 20 (FIG. 2) and also the trunnion-like shafts 35 formed by the filling of passage 33 with bearing material (FIG. 3).

When the molding operation is completed, lifting of the mold section 34 off the lower section 36 results in some upward movement of the mold insert 78 under the influence of the spring 84. This severs the gate at the surface of the housing 10 thereby leaving the trunnions 35 as integrated parts of the rod end. Elevation of the ejector plate assembly 50 lifts pins 56 thereby unseating the sprues.

In the molding of the raceway 32, it is important that the cavity 102 (FIG. 6) completely fill. This is assured by providing the exhaust runner 66 such that a slight amount of overflow insures filling of the cavity 102.

Figure 9:
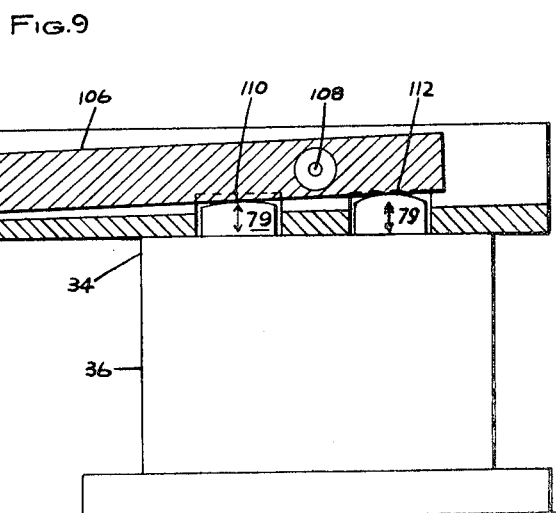
FIG. 9 is a side view in longitudinal section of motion-producing apparatus whereby the apparatus of FIG. 5 is operated.

In FIG. 9 is illustrated the mold apparatus just described in combination with an actuating mechanism for reciprocating the inserts 78. This mechanism includes a simple lever 106 pivoted at 108 to a member fixed with respect to the mold section 34 having portions on opposite sides of the pivot 108 engageable at 110 and 112 with the two inserts 78, respectively. The outer end 110 of the lever 106 is provided with furcations 111 and 113 which engageably straddle eccentrically mounted wheel 112 which rotates about a center 114. As the eccentric 112 rotates, the lever 110 will be reciprocated vertically thereby causing a corresponding movement of the portions 110 and 112 of the lever. As one mold insert is being forced downwardly, the other one rises under the force of the respective springs 84.

With a diameter of about 0.740 inches for the recess 20 in the head 12, a diameter of 0.630 inches for the parts 22, a ball diameter of 0.625 inches, a dimension of eleven thirty-seconds inches between the two flat surfaces 24, a width of 0.156 inches for recess 20, a diameter of 0.554 inches for the bores 72 and 74, and a plastic bearing material of glass reinforced nylon, it has been found that a stroke of 0.030 inches at a rate of 1,700 cycles per minute provides free-swiveling movement of the ball 16 in the plastic raceway 32 without any undue looseness. If a greater or lesser degree of swiveling freedom is desired, the length of the excursion may be correspondingly altered, increasing the excursion producing greater freedom of movement.

For the typical parameters just given, eccentric 112 is rotated at about 1,700 rpm thereby reciprocating the inserts 78 at a corresponding rate. The plastic injected into the cavity during the operation is at relatively high pressure, from about 10,000 to 25,000 pounds per square inch. Reciprocatory movement of the inserts and the ball 16 is started prior to the injection of the liquid plastic into the cavity 102 and continued until after the plastic is hardened.

A plastic bearing material found to be operable is glass reinforced nylon containing in parts by weight 40 parts fiber glass of about 1/8 inch to 1/4 inch fiber length, 100 parts nylon and 5 parts molydisulphide. Other compositions for bearing material, both plastic and metal, may be used without departing from the basic concepts of this invention.

This rod end removed from the molding apparatus needs no further operations in assuring proper swiveling clearance for the ball.

Upon hardening, it is theorized that the plastic has some memory and will shrink toward the ball 16 thereby tending to assume the shape of the ball. By controlling the size of the reciprocatory excursion, the actual finished clearance between the ball 16 and the bearing raceway 32 can be controlled.

The concepts of this invention allow production of rod-end bearing assemblies such as shown and described in which the ball 16 will neither be too loose nor too tight in its raceway of bearing material. It has been found that the rate of vibration, the length of the vibratory excursion and other manufacturing steps including the smoothness of the ball 16, can be varied for obtaining desired swivel freedom in the finished product. For example, the pressure and temperature at the moment of injection are not found to be critical. Thus, losses due to imperfectly formed assemblies are minimal thereby leading to high production efficiencies and corresponding lower costs.

In the finished product, the ball 16 is found to have a relatively large swing angle and substantial strength against dislodgement from the raceway 32. The raceway 32 itself is formed of bearing material having a maximum degree of lubricity as compared with the housing that contains it. The thickness of the head 12 as viewed in FIG. 2 can be made substantial thereby providing a maximum amount of strength in the housing itself. The housing need not be deformed or altered after the molding operation to assure proper retention and operating clearance for the ball.

In summary, the vibration of the ball 16 may be started at the moment the mold sections 34 and 36 are closed and before injection of the liquid bearing material. This vibration is continued until the bearing material has solidified and just before the mold sections are opened.

While tunnel gates 64 (FIGS. 5 and 6) are disclosed, it will appear as obvious to persons skilled in the art that these may be omitted and the mold cavities 44 and 46 so formed that one-half is in each of the mold sections 34 and 36. Thus, the sprue 62 would communicate directly with the passages 33 in the housing 10. The tunnel gates 64, however, in this invention are preferred.

It will be obvious to persons skilled in the art that the present invention is not limited to rod ends, but instead relates to bearing assemblies generally wherein a swivel member such as the ball 16 is mounted for universal swiveling movement in a retaining frame or housing. Also, it is not necessary that the housing in which the ball is mounted have a socket which opens through both sides thereof. Instead, the socket may be closed at one end, as is true for conventional ball and socket assemblies, and the ball reciprocated in a straight line between the open and closed ends of the socket to provide the necessary swiveling clearance after the injection of liquefied bearing material in the clearance between the ball and socket. The ball may also be solid, that is, not be provided with an internal bore as is true of the embodiment shown in FIGS. 1 through 4, and furthermore can be detachably or integrally connected to a stud of the type conventional in ball and socket assemblies.

While FIGS. 1 through 4 disclose the trunnion-like passages 33 as being diametrically opposite each other, they may be located differently so long as one of them serves as an overflow to assure that the cavity 102 fills completely.

Inasmuch as the housing 10 itself serves as part of the mold and the mold sections 34 and 36 serve as another part, the particular shape of the housing 10 which partially forms the cavity can be drastically altered, relying on the cavities in the mold sections 34 and 36 exclusively to complete the shape of the raceway. For example, the housing 10 as viewed in FIG. 6 could be thinner between the two faces 24 thereof than shown, and even be sheet metal one-eighth inch thick, such that injected plastic would fill the spaces between these narrower surfaces 24 and the cavity surfaces 44 and 46. In this instance, the plastic would essentially embrace the housing 10, or more specifically, the head 12 thereof.

Suitable cut-outs or other holding devices would have to be provided in the mold sections 34 and 36 to embrace a peripheral portion of the sheet metal housing and thereby position the latter in place during molding.

In one embodiment of this invention, the balls 16 are tumbled to provide a smooth finish and then chromium plated. In still other instances, the balls 16 may be dipped in a suitable lubricant before the molding operation. Both the provision of a smooth surface and lubricant affect the swiveling freedom of the ball in the finished product.

While there have been described above the principles of this invention in connection with specific apparatus, it is to be clearly understood that this description is made only by way of example and not as a limitation to the scope of the invention.

What is claimed is:

1. For molding a raceway into a bearing assembly, said bearing assembly including a supporting member provided with an opening therethrough, and a ball-shaped swivel member mounted within said opening and spaced from the surface of said supporting member which defines said opening, said space being annular in shape and having opposite open ends; apparatus comprising first mold means for at least partially closing the opposite ends of said space, second means for holding said swivel member in position in said opening and for completing the closure of said opposite ends, said first and second means being relatively movable whereby said swivel member may be moved relative to said supporting member, means for moving in an alternating pattern said first and second means relative to each other in a direction generally parallel to the axis of said space, and means for filling said space with liquefied hardenable bearing material.

2. The apparatus of claim 1 in which said first mold means closes a larger portion of said opposite open ends than does said second means.

3. The apparatus of claim 1 in which said first mold means includes a die having a bore portion therein, said second means includes two clamping elements tandemly arranged and received for reciprocation by said bore portion, and said clamping elements having separated facing surfaces engageable with said swivel member for holding the latter in place.

4. The apparatus of claim 3 in which the bore portion of said die has separated facing mold surfaces which define a mold space therebetween and serve as the partial closure for the opposite ends of said annular space, said clamping elements having opposed mold surfaces, respectively, disposed adjacent to said die mold surfaces, respectively, which serve to complete the closure of said opposite ends, said die mold surfaces closing a larger radial portion of said opposite open ends than do the mold surfaces of said clamping elements.

5. The apparatus of claim 4 including said supporting and swivel members, said supporting member being clamped between said die mold surfaces and said swivel member being clamped between said clamping elements whereby said space is defined on the outer periphery by said supporting member, the inner periphery by said swivel member, and at the ends by said die mold surfaces and the mold surfaces of said clamping elements.

6. The apparatus of claim 3 in which said first mold means closes a larger portion of said opposite open ends than does said second means, said die including two mold sections selectively movable into and out of operative engagement with each other, said mold sections having parting surfaces which are sealingly engageable with each other, a cavity in said die defined by two portions in said parting surfaces, respectively, said cavity being intersected by said bore portion and having a shape conforming to that of said bearing assembly supporting member, said cavity having opposite ends, one end being in one cavity portion and the other end being in the other cavity portion, the last-mentioned ends being defined by separated facing surfaces which extend radially inwardly of said opening to define circular end closures for the opposite open ends of said space, an injection sprue in said die leading to said cavity, and an overflow sprue in said die leading away from said cavity.

7. The apparatus of claim 6 including means yieldably urging said clamping elements toward each other, said facing surfaces of said clamping elements being shaped to conform to the shape of said swivel member, and reciprocating means engaged with one of said clamping elements for alternately forcing said one element toward the other thereby to reciprocate both in unison.

8. The apparatus of claim 7 in which said urging means includes a compression spring engaging the other of said clamping elements, and a locating pin secured to one clamping element and extending coaxially across the space between said clamping elements.

9. The apparatus of claim 5 in which the surface of said swivel member that defines said inner periphery of said annular space is substantially spherical, and the surface of said supporting member that defines the outer periphery of said annular space is at least in part substantially spherical.

* * * * *